United States Patent
Beisheim et al.

(10) Patent No.: US 7,912,609 B2
(45) Date of Patent: Mar. 22, 2011

(54) MOTOR VEHICLE COMPRISING A PREVENTIVE PROTECTIVE SYSTEM

(75) Inventors: Dirk Beisheim, Althengstett (DE); Xavier Christmann, Stuttgart (DE); Dominic Reutter, Birenbach (DE); Juergen Schmitt, Koenigsbach-Stein (DE); Florian Zenker, Stuttgart-Feuerbach (DE)

(73) Assignee: Daimler AG, Stuttgart (DE)

( * ) Notice: Subject to any disclaimer, the term of this patent is extended or adjusted under 35 U.S.C. 154(b) by 711 days.

(21) Appl. No.: 11/659,373

(22) PCT Filed: Jul. 30, 2005

(86) PCT No.: PCT/EP2005/008290
§ 371 (c)(1), (2), (4) Date: Sep. 14, 2007

(87) PCT Pub. No.: WO2006/015748
PCT Pub. Date: Feb. 16, 2006

(65) Prior Publication Data
US 2008/0306658 A1 Dec. 11, 2008

(30) Foreign Application Priority Data
Aug. 6, 2004 (DE) .......... 10 2004 038 167

(51) Int. Cl.
B60R 22/48 (2006.01)
B60R 21/01 (2006.01)
B60R 21/16 (2006.01)

(52) U.S. Cl. .......... 701/45
(58) Field of Classification Search .......... 701/46
See application file for complete search history.

(56) References Cited

U.S. PATENT DOCUMENTS

| 3,168,928 | A | * | 2/1965 | Ljungstrom | 180/116 |
|---|---|---|---|---|---|
| 3,243,822 | A | * | 4/1966 | Lipkin | 2/455 |
| 3,918,545 | A | | 11/1975 | Andres et al. | |
| 5,521,580 | A | | 5/1996 | Kaneko et al. | |
| 5,667,246 | A | * | 9/1997 | Miller, III | 280/806 |
| 5,746,444 | A | * | 5/1998 | Foo et al. | 280/735 |
| 5,957,490 | A | * | 9/1999 | Sinnhuber | 280/735 |
| 6,037,860 | A | | 3/2000 | Zander et al. | |
| 6,106,013 | A | * | 8/2000 | Doty et al. | 280/806 |

(Continued)

FOREIGN PATENT DOCUMENTS
DE 2 249 759 4/1974
(Continued)

OTHER PUBLICATIONS

German Search Report dated Feb. 18, 2005 with an English translation of relevant portion (Eight (8) pages).
(Continued)

*Primary Examiner* — Thomas G Black
*Assistant Examiner* — Shelley Chen
(74) *Attorney, Agent, or Firm* — Crowell & Moring LLP

(57) ABSTRACT

A motor vehicle including a preventive protective system which includes safety devices actuated as a function of information obtained from a vehicle state sensor system and evaluated in a data evaluation and control device. In the associated process, the data evaluation and control device compares the recorded information with at least one triggering threshold value and actuates at least one safety device which is associated with this driving state when a criticality of the driving state is identified. Triggering of the associated safety device is actuated with respect to a force time gradient as a function of the identified criticality of the driving state.

18 Claims, 2 Drawing Sheets

U.S. PATENT DOCUMENTS

| | | | |
|---|---|---|---|
| 6,169,945 B1 | 1/2001 | Bachmaier | |
| 6,259,167 B1 * | 7/2001 | Norton | 307/10.1 |
| 6,315,320 B1 * | 11/2001 | Kreuzer | 280/728.2 |
| 6,420,996 B1 * | 7/2002 | Stopczynski et al. | 342/70 |
| 6,564,132 B2 | 5/2003 | Hackenberg | |
| 6,758,495 B2 | 7/2004 | Brambilla et al. | |
| 6,969,022 B2 * | 11/2005 | Bell et al. | 242/379.1 |
| 7,168,734 B2 * | 1/2007 | Katsuda | 280/730.2 |
| 7,331,600 B2 * | 2/2008 | Miyata | 280/730.1 |
| 2002/0134607 A1 | 9/2002 | Recknagel | |
| 2002/0175507 A1 * | 11/2002 | Kobayashi et al. | 280/735 |
| 2003/0160436 A1 * | 8/2003 | Bentele-Calvoer et al. | 280/735 |
| 2004/0080204 A1 | 4/2004 | Enomoto et al. | |
| 2004/0164535 A1 * | 8/2004 | Katsuda | 280/737 |
| 2005/0252708 A1 | 11/2005 | Theisen | |
| 2006/0076178 A1 | 4/2006 | Eberle et al. | |
| 2006/0164227 A1 | 7/2006 | Auer et al. | |

FOREIGN PATENT DOCUMENTS

| | | |
|---|---|---|
| DE | 43 38 244 C2 | 5/1996 |
| DE | 197 24 101 A1 | 12/1998 |
| DE | 197 41 631 A1 | 3/1999 |
| DE | 199 10 596 A1 | 9/2000 |
| DE | 199 60 644 A1 | 6/2001 |
| DE | 199 61 799 A1 | 7/2001 |
| DE | 100 05 010 A1 | 8/2001 |
| DE | 101 00 880 A1 | 7/2002 |
| DE | 101 21 386 C1 | 8/2002 |
| DE | 102 02 908 A1 | 7/2003 |
| DE | 102 12 963 A1 | 10/2003 |
| DE | 102 23 363 A1 | 10/2003 |
| DE | 102 50 732 B3 | 4/2004 |
| DE | 103 48 822 A1 | 5/2004 |
| EP | 1 415 867 B1 | 5/2004 |
| GB | 2 371 780 A | 8/2002 |
| WO | WO 03/080405 A2 | 10/2003 |

OTHER PUBLICATIONS

International Search Report dated Oct. 21, 2005 and PCT/ISA/237 with an English translation of the relevant portions (seventeen (17) pages).

* cited by examiner

MOTOR VEHICLE COMPRISING A PREVENTIVE PROTECTIVE SYSTEM

CROSS REFERENCE TO RELATED APPLICATIONS

This application is a national stage of PCT International Application No. PCT/EP2005/008290, filed Jul. 30, 2005, which claims priority under 35 U.S.C. §119 to German Patent Application No. 10 2004 038 167.4, filed Aug. 6, 2004, the entire disclosures of which are herein expressly incorporated by reference.

BACKGROUND AND SUMMARY OF THE INVENTION

The present invention relates to a motor vehicle including a preventive protective system.

It is known to equip motor vehicles, such as passenger cars, with active and passive safety devices which allow the driver to better control his vehicle even in critical situations and thus prevent the vehicle from being involved in an accident. Safety devices of this type also contribute to reducing the severity of an accident in the event of a collision.

Safety systems which take preventive action even before a possible collision and use a so-called pre-crash phase (i.e., a period of time starting from when corresponding detection systems in the vehicle detect a high probability of collision until the actual impact) to increase occupant protection by additional safety measures and thus reduce the severity of an accident, are known as preventive protective systems or so-called PRE-SAFE™ systems. Preventive protective systems use information which is provided by various sensor devices of the motor vehicle to identify possible accident situations. The sensor devices are, in particular, a constituent part of an electronic driving stabilizing program and/or a constituent part of a distance sensor system. Conclusions are then drawn about a possible accident on the basis of the identified situation, and corresponding measures for conditioning the vehicle, restraint systems for occupants and possibly protective devices for other involved parties (e.g., pedestrians) for the imminent accident are initiated.

German patent document DE 101 21 386 C1 discloses a method for actuating a reversible occupant protection means in a motor vehicle. The motor vehicle has a reversible occupant protection system which can be activated and thus moved to the active position before a collision occurs. To this end, a sensor system detects driving state data which is monitored for emergency braking, oversteering or understeering operations. If emergency braking, oversteering and/or understeering are/is identified, the occupant protection system is activated, but only when a minimum speed is exceeded. The sensor system for detecting the driving state data may include a steering angle sensor, a pedal travel sensor, a brake pressure sensor, a wheel rotational speed sensor, an acceleration sensor and a yaw rate sensor.

German patent document DE 100 05 010 C2 discloses a method for restraining an occupant on a vehicle seat, with the occupant being drawn into the vehicle seat with a specific force by a reversible belt pretensioner when a critical driving state is identified, and then being held in a drawn-back position on the vehicle seat with a retaining force, with the retaining force being selected to be lower than the force which is used to draw the occupant back onto the vehicle seat, and the retaining force lasting during the identified critical state.

Furthermore, German patent document DE 22 49 759 C2 describes a restraint system for motor vehicle occupants, with a safety belt being tightened starting from a predefined acceleration threshold and the magnitude of the tightening force being set as a function of the change in traveling speed per unit time and/or of the weight of the occupant.

The two solutions known from German patent documents DE 22 49 759 C2 and DE 100 05 010 C2 share the common feature that the force of the respective safety device, i.e., the magnitude of the tightening force of the safety belt, is set as a function of the specified critical driving state and further parameters, it being necessary to avoid excessively high loads on the occupant when pretensioning the belt.

Even if it is possible to use such protective systems, which are also used in practice to set an absolute value that is matched to the safety-critical driving situation, for a force which is to be exerted on the vehicle occupant by the safety device in question, the triggering characteristics of safety belts are primarily designed for the worst-case accident. Thus, although it is possible to vary the belt pretensioning forces of safety belts such that the restraining force is reduced after the belts are triggered, the usually reversible occupant protection means are actuated so quickly that the entire protective action is achieved in the event of the worst-case load situation.

However, triggering characteristics such as these are not required in many critical driving states and in a few critical driving situations have a significant adverse effect on feelings of comfort and acceptance by the vehicle occupants on account of their aggressiveness.

An object of the invention is to provide a motor vehicle including a preventive protective system, which permits a triggering behavior of safety devices which is better matched to the current driving state.

To achieve the above-mentioned object, the invention provides a preventive protective system in a motor vehicle, in which a data evaluation and control device compares the information recorded by a safety sensor system with at least one triggering threshold value and actuates at least one safety device associated with the driving state when a criticality of the driving state is identified. At least triggering of the associated safety devices is actuated with respect to a force/time gradient as a function of the identified criticality of the driving state. This system has the advantage that not only the maximum magnitude of actuating forces of a safety device, but also the actuating forces and actuating times, can be varied and adapted to the existing driving situation.

A criticality of the driving state is usually identified on the basis of an evaluation of the data from a driving state sensor system, but may also include data from a device for identifying the vehicle surroundings.

Therefore, for example, in the case of a reversible belt pretensioner as the associated safety device, the belt pretensioning forces and pretensioning times may be parameterized depending on the existing driving state such that when the vehicle skids with a low frictional force, with the occupants not being moved or being moved only to an insignificant extent on account of low forces of mass inertia, the time until the required belt force is reached is set to be relatively long. In a driving situation such as this, the belt secures the occupant slowly with the required force in a manner which is adapted to the situation.

The actuation of the safety device, which is actuated as a function of the existing driving state, according to the present invention, not only increases the safety of the occupants by avoiding an unadapted, excessively aggressive or excessively soft triggering behavior of the safety device but also considerably increases feelings of comfort of the occupants and therefore acceptance of the entire preventive protective system by the occupants.

In this case, an identified criticality of the vehicle state can not only be understood as a driving state which will probably lead to the vehicle being involved in an accident, but also a driving state which is created in a controlled manner by a sporty driving style and in which the actuation of suitable safety devices is appropriate in order to increase the comfort of the vehicle occupants. Therefore, when traveling around a corner, for example, a vehicle occupant can be slightly drawn into the seat and thus supported better on the sides as a result of the variable design of the force/time gradient of a belt pretensioner, with side cushions of a vehicle seat being better loaded and involved in securing the occupant.

A further contribution to increasing the comfort of the vehicle occupants is made when a maximum force of the associated safety device, which force is parameterized as a function of the identified criticality of the driving state, is reduced over a period of time which can be parameterized. In this way, it is possible, for example, to implement gentle release of a belt pretensioner or of a movable cushion element, such as a knee cushion.

In principle, actuation with a variable force/time gradient is suitable, according to the invention, for all safety devices which are provided in a vehicle, with the safety devices being, for example, a reversible belt pretensioner, an electric seat-adjusting device, a restraint cushion, in particular a knee cushion, whose shape, size and/or position can be adjusted, or other vehicle components which can be electrically, hydraulically or pneumatically adjusted with a view to increasing safety.

In this case, actuation can be performed, according to the invention, by an electric motor which is associated with the respective safety device and whose rotational speed can be variably controlled. Therefore, given corresponding expansion of the engine controller in a controller of a reversible occupant protection device, for example, slower revolutions of the electric motor can slow down tightening of the belt webbing or, when another occupant protection device is used, slow down their extension speed.

Assuming that a longitudinal-dynamics criticality generally constitutes a higher risk to vehicle occupants than a lateral-dynamics criticality, it is advantageous when a longitudinal-dynamics criticality of the driving state is assigned a larger force/time gradient than a lateral-dynamics criticality.

A longitudinal-dynamics criticality, with which activation of safety devices is associated, occurs particularly in the case of emergency braking and panic braking, with emergency braking being identified by a high operating speed of a brake pedal or by a predefined driver reaction. In this case, the triggering threshold can be formed approximately on the basis of a braking assistant being switched on.

Likewise, panic braking (a braking operation in which a deceleration request by the driver is considerably higher than the vehicle deceleration) can advantageously be detected on the basis of a driver reaction. In a driving state such as this, it is advantageous if safety devices are triggered, in principle, only in the case of a low coefficient of friction.

Lateral dynamics-critical driving states include, for example, severe oversteer, severe understeer and critical steering movements.

Actuation of the corresponding safety device can be stated even more precisely and matched to the respective situation if the actuation is carried out as a function of determined physiological variables of an occupant. These include, in particular, the size of vehicle occupants and their weight. This data can be determined by a weight detection device and a body size detection device which are connected to the data evaluation and control device. The weight detection device can be formed as an integral unit with a seat occupancy identification device, and the body size detection device can be formed as an integral unit with a seat position sensor system and an optical, head position determination device, for example.

Using devices such as these, some of which are already installed in the motor vehicle as standard equipment, it is also possible to determine the position of an occupant in the vehicle, which information may be used to actuate the safety device in an exemplary embodiment of the invention.

Important input signals for controlling safety devices include the vehicle speed or a gradient of the vehicle speed, with the force/time gradient of the actuation of a safety device being set as a function of the vehicle speed and/or of a gradient of the vehicle speed, in one exemplary embodiment of the present invention.

In this case, specific safety devices may be activated only starting from a specific vehicle speed and the actuators of the safety devices can only be actuated until the vehicle speed reaches a very low value of, for example, 3 km/h.

A further triggering behavior of safety devices, which behavior is matched to the current driving state, can be achieved if the triggering threshold value is adapted as a function of a total vehicle acceleration and a vehicle speed when a lateral dynamics-critical driving situation is identified.

In this case, the triggering thresholds of the preventive protective system can, for example, be applied separately for high coefficients of friction and for low coefficients of friction.

In the case of a high coefficient of friction, for example, the triggering threshold value which is associated with a lateral dynamics-critical driving situation, such as a state of understeer or a state of oversteer, can be reduced. This leads to an increase in the number of times the preventive protective system is activated at high vehicle speeds, and therefore acceptance of the preventive protection system by a user of the motor vehicle may be increased further.

Designing the preventive protective system in this way means it is possible to map the feeling of danger felt by the vehicle user. The vehicle user generally feels safe at low vehicle speeds and low coefficients of friction, with the result that the triggering threshold value can assume a relatively high value. At high vehicle speeds and high coefficients of friction however, the subjective feeling of danger is generally more pronounced, with the result that the triggering threshold value then advantageously assumes a lower value.

In one exemplary embodiment of the invention, the triggering threshold value is dynamically adapted at least substantially continuously, i.e., smoothly.

Starting from a threshold value at a low vehicle speed and a low total vehicle acceleration (i.e., in the case of a low coefficient of friction), it is expedient to reduce the triggering threshold value by up to approximately 50% as the vehicle speed increases and/or as the total vehicle acceleration increases. This ensures that the preventive protective system always responds in a manner which is matched to the driving situation.

The driving state sensor system may include a sensor system of various designs which is equipped, for example, with a steering angle sensor, a pedal travel sensor, a brake pressure sensor, a wheel rotational speed sensor, an acceleration sensor, a yaw rate sensor and/or a distance sensor.

The data evaluation and control device of the preventive protective system may be a data processing device of a driving stabilizing system of the motor vehicle which is often present in any case, particularly in modern motor vehicles. As an alternative, it is of course possible to employ a separate data processing device.

To identify a lateral dynamics-critical driving situation, such as understeer, in which the radius of the desired path prescribed by the steering angle is less than the radius of the path actually traveled by the vehicle, or oversteer, in which the radius of the desired path prescribed by the steering angle is greater than the radius of the path actually traveled, the total vehicle acceleration, which is found by adding the longitudinal vehicle acceleration and the lateral vehicle acceleration and is determined by corresponding acceleration sensors and possibly by a yaw sensor, may be analyzed. If the analysis shows that the triggering threshold value which varies as a function of the coefficient of friction is exceeded, the data evaluation device outputs a collision plausibility, so that the safety devices which interact with the preventive protective system can be activated and conditioned in accordance with the possible accident situation.

Other objects, advantages and novel features of the present invention will become apparent from the following detailed description of the invention when considered in conjunction with the accompanying drawings.

DETAILED DESCRIPTION OF THE DRAWINGS

Figure 1:
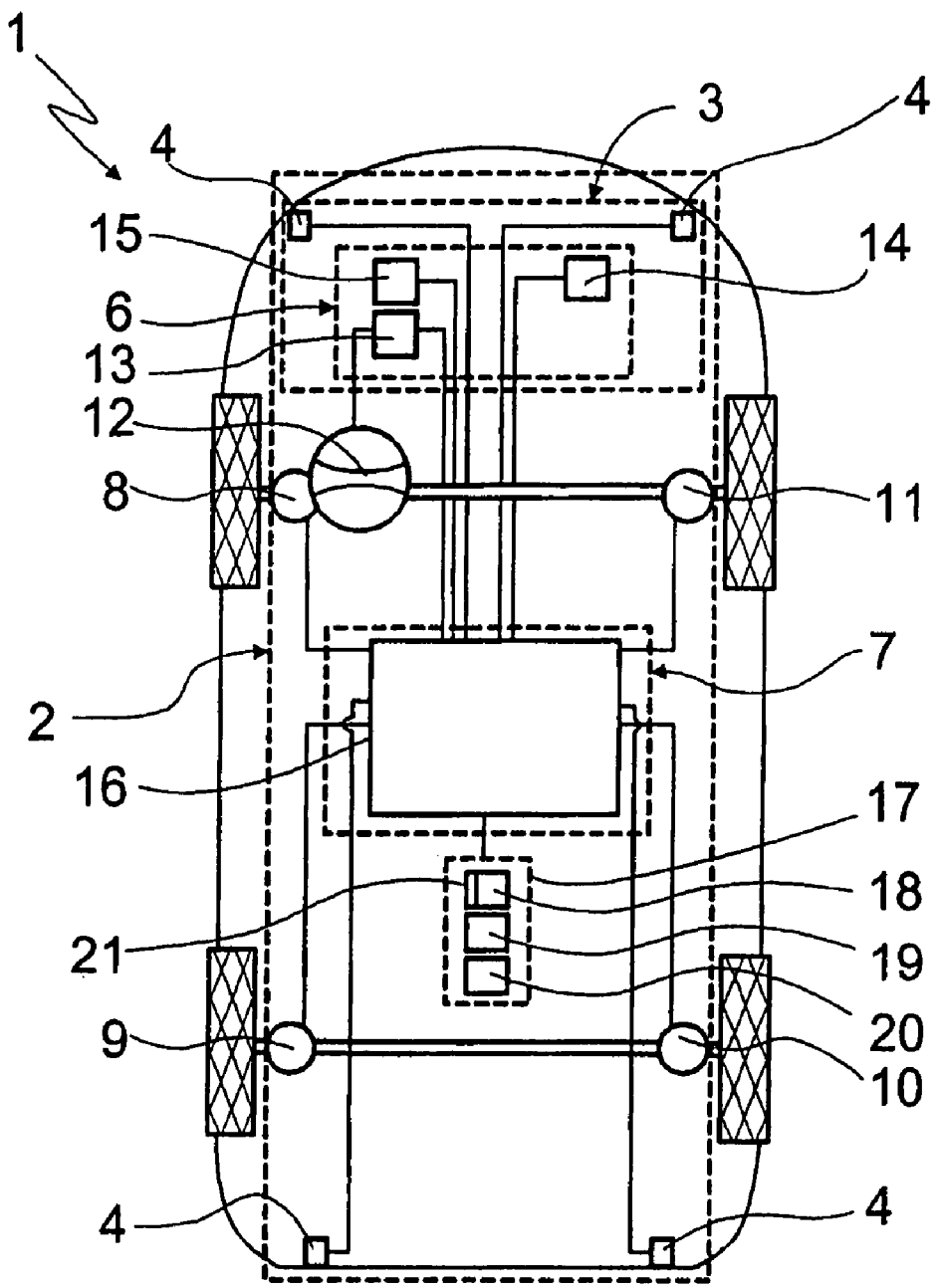
FIG. 1 shows a highly schematic plan view of a motor vehicle including a preventive protective system which is designed according to the invention.

FIG. 1 schematically illustrates a motor vehicle 1, which may be in the form of a passenger car or a commercial vehicle and which is equipped with a preventive protective system 2, which is designed according to the invention.

The preventive protective system 2 has a safety sensor system 3 which includes a device 4 for identifying the vehicle surroundings and a driving state sensor system 6. The driving state sensor system 6 is configured to detect longitudinal-dynamics and lateral-dynamics driving state information, inter alia, to identify emergency and panic braking, oversteer and/or understeer of the motor vehicle 1. To this end, information or data, inter alia, is used which is supplied by wheel rotational speed sensors 8, 9, 10 and 11, by a steering angle sensor 13 which is arranged in the region of a steering wheel 12, by a longitudinal acceleration sensor 14 and a lateral acceleration sensor 15.

The driving state sensor system 6 communicates with a driving dynamics functionality 7, such as an antilock brake system and/or an electronic stability program in which a data evaluation and control device 16 of the preventive protective system 2 is integrated.

To this end, the driving state sensor system 6 can analyze further important driving dynamics variables, such as a vehicle speed, a yaw rate, a spring compression travel and a spring extension travel, the ride level of the vehicle, an accelerator pedal movement, an accelerator pedal position, a brake pedal position, a brake pedal movement, a steering wheel speed and/or a steering wheel acceleration, during normal operation of the motor vehicle. This analysis involves comparing actual values of these variables with prescribed setpoint values and threshold values. For example, the antilock brake system and/or the electronic stability program, which have the task of assisting the driver of the motor vehicle during driving-critical situations in order to avoid an accident, are activated on the basis of these comparisons.

The information determined by the driving state sensor system 6 is evaluated in the data evaluation and control device 16 in such a way that it is compared with a triggering threshold value for the purpose of utilizing and/or activating the preventive protective system 2, with at least one selection of existing safety devices 17 being activated when the triggering threshold value is exceeded. At this point, the information determined by a device 4 for identifying the vehicle surroundings can also be evaluated and included in the triggering decision.

The device 4 for identifying the vehicle surroundings may operate with any kind of sensors which detect the surroundings. In this case, it is possible to use electromagnetic sensors, which operate with radar waves, millimeter and micrometer waves, optical sensors, such as lidar systems or infrared systems, and image-forming sensors, for example, video in mono or stereo. It is also possible, of course, to use a combination of such sensors and the information obtained from the sensors to improve the quality of the conclusion.

The sensors of the device for identifying the vehicle surroundings have to supply the physical variables of distance and/or speed between the motor vehicle and the object with which it may collide, it being possible in each case to calculate one of the variables by means of mathematical differentiation or integration. On account of the sensors being arranged such that they are fixed to the vehicle, the variables measured by the sensors are always relative variables between the vehicle and the detected object with which it may collide. The monitored range is given by the arrangement of the sensors of the device for identifying the vehicle surroundings, with sensors particularly being arranged on the front and back of the motor vehicle to predominantly monitor the traffic on the left. However, it is also feasible to arrange sensors on the sides of the vehicle, in order to identify lateral collisions.

In the present case, the safety devices 17 may include a reversible belt pretensioner 18, restraint cushions 19 and an actuating system of an electrical seat adjusting device 20, it being possible to move the vehicle seats and/or their components, as a function of whether they are occupied, into a position which provides the vehicle occupant in question with the highest possible degree of safety in the event of the motor vehicle 1 possibly being involved in an accident.

A triggering algorithm which is provided for the safety devices 17 and is stored in the data evaluation and control device 16, in accordance with an exemplary embodiment of the present invention, is explained below by way of example for the reversible belt pretensioner 18 with reference to FIG. 2.

Figure 2:
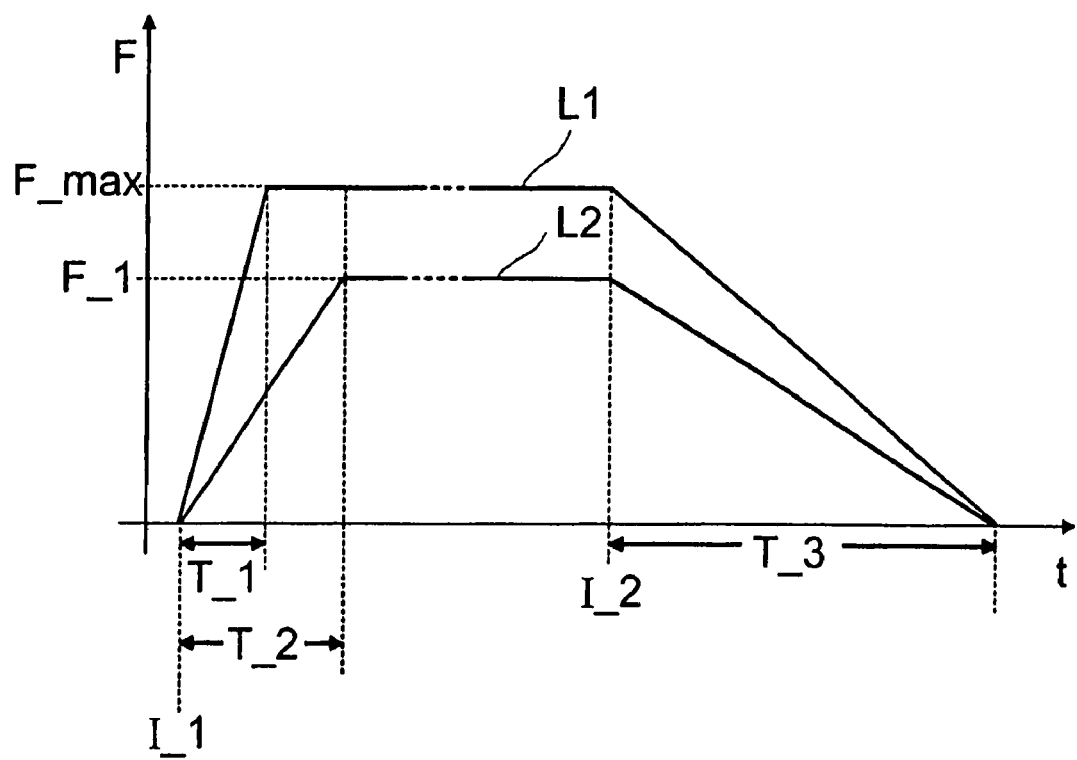
FIG. 2 shows a qualitative force/time graph for actuation of a safety device of the preventive protective system from FIG. 1.

FIG. 2 shows a force (F)/time (t) graph, where the force F is the restoring force or belt pretensioning force of the reversible belt pretensioner 18, and the time t represents the actuating time for the restoring force F.

Given information I_1 that a longitudinal-dynamics criticality of the current driving state exists, which corresponds, for example, to emergency or panic braking and in which parametrically prespecified triggering thresholds for the reversible belt pretensioner 18 are exceeded, the data evaluation and control device 16 carries out a plausibility check of all input and surroundings data in a manner known per se, and a time T_1 or T_2 for pretensioning the belt is started when triggering identification for the reversible belt pretensioner 18 is plausible. Alternatively, the plausibility check may be carried out if a lateral-dynamics criticality of the driving state is identified by the data evaluation and control device 16, for example, on account of severe oversteer or understeer outside a range which can be corrected by the electric stability program and on account of manageable driving physics with parametrically prespecified release thresholds being correspondingly exceeded.

A parameterizable force (F)/time (t) gradient for operating the reversible belt pretensioner 18 is output depending on the determined driving state and depending on the determined criticality, with a first profile of a predefined value for the belt pretensioning force F over time t being reproduced by a line L1, and a second profile of the belt pretensioning force F over time t being reproduced by a line L2 in FIG. 2 by way of example.

If the information I_1 corresponds to a triggering signal for pretensioning the belt when a longitudinal-dynamics criticality of the driving state is identified, the first profile L1 for the belt pretensioning force F is set. In this case, the belt pretensioning force is reached as quickly as possible, e.g., within 120 ms, when there is no slack in the belt, or a belt webbing is retracted by at least 80 mm within approximately 120 ms when there is 200 mm of slack in the belt.

The time period T_1 of approximately 120 ms, which is prespecified until a parameterizable maximum belt pretensioning force F_max of 140N, for example, is reached, can also be parameterized to be larger or smaller depending on the driving state and criticality.

The second actuation of the pretensioning force F according to line L2 shows parameterization of a maximum belt pretensioning force F_1 which is prespecified for an identified lateral-dynamics criticality over a prespecified time period T_2, with the maximum required belt pretensioning force F_1 being parameterized to be smaller than the maximum pretensioning force F_max provided in the case of a longitudinal-dynamics criticality. The time period T_2 for reaching the maximum pretensioning force F_1 in the case of lateral-dynamics criticality is parameterized to be longer than in the case of the actuation profile L1 for a longitudinal-dynamics criticality.

The parameterization of the maximum force F_1 and the time period T_2 for building up this force when a lateral-dynamics criticality is identified may also be provided, for example, such that the time period T_2 for building up the belt pretensioning force F_1 lasts for up to 2000 ms, and the belt pretensioning force F_1 reaches the maximum belt pretensioning force F_max in the case of a longitudinal-dynamics criticality.

When the required level for the belt pretensioning force F_max or F_1 is reached, this belt pretensioning force is maintained until information I_2 is entered, which information, in the present case, represents loosening information for the preventive protective system 2 which includes the belt pretensioner 18.

When the information I_2 for loosening the belt pretensioner 18 is received, the electric motor 21 of the reversible belt pretensioner 18 is actuated during a parameterizable time period T_3 for the purpose of loosening the increased belt tension with the maximum belt pretensioning force F_max or F_1, with this time period T_3 being parameterized in such a way that the belt is loosened gently and without jerking.

At the end of the time period T_3 for releasing the belt tension, a check is made as to whether the belt tension has been completely relieved. If a first release process is not successful, the existing algorithm provides initiation of a second release attempt.

As boundary conditions, the existing actuation of the belt pretensioner 18 further provides that the data input in the data evaluation and control device 16 includes state data from a belt buckle, with the triggering algorithm shown in FIG. 2 being activated only when the belt is inserted. If information such as whether the belt is inserted or not is not available, the electric motor 21 of the belt pretensioner 18 is not actuated at this time.

It is further provided that when the situation changes, actuation of the belt pretensioner 18 is may be immediately interrupted. The pretensioning or loosening process is furthermore adapted or interrupted if a crash event is identified, or if a fault is identified in the information about criticality.

The triggering algorithm which is stored in the data evaluation and control device 16 is further designed in such a way that the triggering threshold value of the preventive protective system 2 is adapted as a function of a respectively prevailing coefficient of friction, i.e., as a function of a total vehicle acceleration which is made up of the longitudinal and lateral acceleration values measured by the sensors 14 and 15, and the respectively selected vehicle speed in the event of a driving situation which is identified as being critical in terms of lateral dynamics.

In this case, the triggering threshold value is adapted substantially continuously, to be precise in such a way that it is reduced by up to 50% as the vehicle speed increases and as the total vehicle acceleration increases. This means that the preventive protective system 2 is activated from a relatively low triggering threshold value in the case of a high coefficient of friction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. In a motor vehicle, a preventive protection system comprising:
    a safety sensor system configured to detect information about the motor vehicle;
    safety devices which are actuated as a function of information obtained from the safety sensor system; and
    a data evaluation and control device configured to compare the information with a triggering threshold value and actuate a safety device associated with a driving state when a criticality of the driving state is identified,
    wherein triggering of the associated safety device is actuated based on a force/time gradient of the identified criticality of the driving state;
    wherein a maximum force of the associated safety device is parameterized as a function of the identified criticality of the driving state;
    wherein said maximum force is built up over a time period which can be parameterized; and
    wherein a longitudinal-dynamics criticality of the driving state is assigned a larger force/time gradient than a lateral-dynamics criticality.

2. The preventive protective system as claimed in claim 1, wherein the data evaluation and control device actuates the associated safety device with a parameterization of the force and the time, which is associated with the longitudinal-dynamics or lateral-dynamics criticality, to build up or reduce the force after a plausibility check of the longitudinal-dynamics or lateral-dynamics criticality.

3. The preventive protective system as claimed in claim 1, wherein the associated safety device is actuated as a function of determined physiological variables of a vehicle occupant.

4. The preventive protective system as claimed in claim 3, wherein the associated the safety device is actuated as a function of a weight or a body size of the vehicle occupant.

5. The preventive protective system as claimed in claim 1, wherein the associated safety device is actuated as a function of a position of a vehicle occupant.

6. The preventive protective system as claimed in claim 1, wherein the associated safety device is actuated as a function of a vehicle speed or a gradient of the vehicle speed.

7. The preventive protective system as claimed in claim 1, wherein the triggering threshold value is adapted as a function of a total vehicle acceleration and a vehicle speed when a lateral dynamics-critical driving situation is identified.

8. The preventive protective system as claimed in claim 7, wherein the triggering threshold value is reduced up to approximately 50% as the vehicle speed increases or as the total vehicle acceleration increases.

9. The preventive protective system as claimed in claim 1, wherein:
- the associated safety device is configured to be driven by an electric motor, and
- the rotational speed of the electric motor is variably controllable.

10. The preventive protective system as claimed in claim 1, wherein the associated safety device is a reversible belt pretensioner.

11. The preventive protective system as claimed in claim 1, wherein the associated safety device is a restraint cushion which can be moved.

12. The preventive protective system as claimed in claim 1, wherein the safety sensor system comprises one of a vehicle state sensor system and a device for identifying the vehicle surroundings.

13. The preventive protective system as claimed in claim 1, wherein:
- a maximum force of the associated safety device is parameterized as a function of the identified criticality of the driving state; and
- said maximum force is reduced over a time period which can be parameterized.

14. The preventive protective system as claimed in claim 1, wherein the associated safety device is actuated as a function of one of weight and a body size of a vehicle occupant.

15. The preventive protective system as claimed in claim 1, wherein the associated safety device is actuated as a function of position of a vehicle occupant.

16. The preventive protective system as claimed in claim 1, wherein the associated safety device is a reversible belt pretensioner.

17. The preventive protective system as claimed in claim 1, wherein the associated safety device is a restraint cushion which can be moved.

18. A method for protecting occupants of a motor vehicle including a preventive-action protection system, comprising:
- detecting information with a safety sensor system;
- comparing the detected information with a triggering threshold value to determine a driving state of the motor vehicle; and
- actuating a safety device associated with the driving state, if a criticality of the driving state is identified;
- wherein triggering of the associated safety device is actuated, based on a force/time gradient of the identified criticality of the driving state;
- wherein a maximum force of the associated safety device is parameterized as a function of the identified criticality of the driving state;
- wherein said maximum force is built up over a time period which can be parameterized; and
- wherein a longitudinal-dynamics criticality of the driving state is assigned a larger force/time gradient than a lateral-dynamics criticality.

* * * * *